United States Patent
Kihara

(10) Patent No.: US 10,416,813 B2
(45) Date of Patent: Sep. 17, 2019

(54) DISPLAY SYSTEM, DISPLAY DEVICE, INFORMATION PROCESSING DEVICE, AND INFORMATION PROCESSING METHOD

(71) Applicant: SEIKO EPSON CORPORATION, Tokyo (JP)

(72) Inventor: Hirohiko Kihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 22 days.

(21) Appl. No.: 15/467,263

(22) Filed: Mar. 23, 2017

(65) Prior Publication Data

US 2017/0277358 A1 Sep. 28, 2017

(30) Foreign Application Priority Data

Mar. 28, 2016 (JP) .................. 2016-063108

(51) Int. Cl.
| | |
|---|---|
| G06F 3/042 | (2006.01) |
| H04N 9/31 | (2006.01) |
| G06F 3/01 | (2006.01) |
| G06F 3/03 | (2006.01) |
| G06F 3/038 | (2013.01) |
| G06F 3/041 | (2006.01) |
| G06F 3/0484 | (2013.01) |

(Continued)

(52) U.S. Cl.
CPC ............ G06F 3/0425 (2013.01); G06F 3/017 (2013.01); G06F 3/0304 (2013.01); G06F 3/0383 (2013.01); G06F 3/0386 (2013.01); G06F 3/03542 (2013.01); G06F 3/03545 (2013.01); G06F 3/042 (2013.01); G06F 3/0416 (2013.01); G06F 3/04845 (2013.01); G06F 3/04883 (2013.01); G09G 3/002 (2013.01); H04N 9/3147 (2013.01); H04N 9/3194 (2013.01); G06F 3/1423 (2013.01); G06F 2203/04106 (2013.01); G09G 2370/042 (2013.01); H04N 9/3155 (2013.01); H04N 9/3197 (2013.01)

(58) Field of Classification Search
CPC ........ G06F 2203/04106; G06F 3/0425; H04N 9/3147; H04N 9/3155; H04N 9/3197
See application file for complete search history.

(56) References Cited

U.S. PATENT DOCUMENTS

| | | | | |
|---|---|---|---|---|
| 6,456,339 B1 * | 9/2002 | Surati | ................. | G03B 37/04 |
| | | | | 348/744 |
| 6,695,451 B1 * | 2/2004 | Yamasaki | ............... | H04N 9/12 |
| | | | | 348/E5.144 |

(Continued)

FOREIGN PATENT DOCUMENTS

| | | |
|---|---|---|
| JP | 2008-116874 A | 5/2008 |
| JP | 2013-171553 A | 9/2013 |

(Continued)

*Primary Examiner* — Kenneth Bukowski
(74) *Attorney, Agent, or Firm* — Oliff PLC

(57) ABSTRACT

Each projector specifies coordinates of a position which is indicated by an indicator, and outputs coordinate information representing the coordinates which are specified, and identification information identifying a display position of the image. An information processing device includes a conversion unit converting the coordinate information into coordinate information representing coordinates in a coordinate system of the information processing device on the basis of the identification information.

9 Claims, 6 Drawing Sheets

(51) Int. Cl.
 *G09G 3/00* (2006.01)
 *G06F 3/0488* (2013.01)
 *G06F 3/0354* (2013.01)
 *G06F 3/14* (2006.01)

(56) References Cited

U.S. PATENT DOCUMENTS

| | | | | |
|---|---|---|---|---|
| 6,733,138 B2* | 5/2004 | Raskar | | H04N 9/12 |
| | | | | 345/32 |
| 8,123,360 B2* | 2/2012 | Hasegawa | | G03B 21/26 |
| | | | | 353/30 |
| 8,439,508 B2* | 5/2013 | Matsuo | | G03B 37/04 |
| | | | | 345/1.3 |
| 8,730,183 B2* | 5/2014 | Lundback | | G06F 3/0416 |
| | | | | 345/156 |
| 9,563,113 B2* | 2/2017 | Lee | | G03B 21/28 |
| 9,822,138 B2* | 11/2017 | Vachal | | C07F 9/65616 |
| 2002/0008697 A1* | 1/2002 | Deering | | G06T 5/006 |
| | | | | 345/418 |
| 2005/0270278 A1* | 12/2005 | Ouchi | | G06F 3/03545 |
| | | | | 345/173 |
| 2006/0181685 A1* | 8/2006 | Hasegawa | | G03B 37/04 |
| | | | | 353/69 |
| 2007/0058140 A1* | 3/2007 | Kobayashi | | G03B 21/26 |
| | | | | 353/94 |
| 2007/0211225 A1* | 9/2007 | Kondo | | H04N 9/3147 |
| | | | | 353/94 |
| 2008/0007700 A1* | 1/2008 | vanBaar | | H04N 9/3147 |
| | | | | 353/94 |
| 2011/0228104 A1* | 9/2011 | Nelson | | H04N 9/3147 |
| | | | | 348/190 |
| 2013/0106908 A1* | 5/2013 | Ichieda | | G09G 3/02 |
| | | | | 345/629 |
| 2015/0244998 A1* | 8/2015 | Yanazume | | H04N 9/3185 |
| | | | | 348/38 |
| 2017/0085848 A1* | 3/2017 | Kiryu | | G06F 3/0488 |

FOREIGN PATENT DOCUMENTS

| | | |
|---|---|---|
| JP | 2015-191484 A | 11/2015 |
| WO | 2015/146189 A1 | 10/2015 |

\* cited by examiner

DISPLAY SYSTEM, DISPLAY DEVICE, INFORMATION PROCESSING DEVICE, AND INFORMATION PROCESSING METHOD

BACKGROUND

1. Technical Field

The entire disclosure of Japanese Patent Application No. 2016-63108, filed Mar. 28, 2016 is expressly incorporated by reference herein.

The present invention relates to a display system, a display device, an information processing device, and an information processing method.

2. Related Art

For example, there is a display device disclosed in JP-A-2013-171553 as a technology for performing handwriting input with two display devices including a touch panel. In a case where a stylus pen is separated from the vicinity of a bezel of one display device, and thus, a pen-up event occurs, and then, a stylus pen is close to the vicinity of a bezel of the other display device, and thus, a pen-down event occurs, the display device performs correction processing with respect to a line which is displayed on the other display device when an elapsed time from the pen-up to the pen-down is within a predetermined time.

In the technology of JP-A-2013-171553, in a case where the stylus pen is moved from one display device to the other display device, the stylus pen is not detected in one display device side, and thus, the pen-up event is detected, and the stylus pen is detected in the other display device side, and thus, the pen-down event is detected. A user moves the stylus pen from one display device to the other display device, but the device recognizes that the stylus pen is separated, and thus, a case can occur in which it is not possible to perform an intended operation of the user.

SUMMARY

An advantage of some aspects of the invention is to provide a technology of enabling processing according to the movement of an indicator to be performed in a case where the indicator is moved from one to the other on adjacent images displayed by different devices.

An aspect of the invention provides a display system, which includes an information processing device, a first display device displaying a first image on the basis of first image data which is supplied from the information processing device, and a second display device displaying a second image on the basis of second image data which is supplied from the information processing device, and displays the first image and the second image side by side, the display system including: a first specifying unit specifying coordinates of a position which is indicated by an indicator in the first image; a first output unit outputting first coordinate information representing the coordinates which are specified by the first specifying unit, and first identification information identifying a display position of the first image; a second specifying unit specifying coordinates of a position which is indicated by the indicator in the second image; a second output unit outputting second coordinate information representing the coordinates which are specified by the second specifying unit, and second identification information identifying a display position of the second image; and a conversion unit converting the first coordinate information output from the first output unit into third coordinate information representing coordinates in a coordinate system of the information processing device on the basis of the first identification information output from the first output unit, and the second coordinate information output from the second output unit into fourth coordinate information representing coordinates in the coordinate system of the information processing device on the basis of the second identification information output from the second output unit.

According to the aspect of the invention, in a case where the indicator is moved from one to the other on adjacent images displayed by different devices, it is possible to perform processing according to the movement of the indicator.

In the aspect of the invention, the display system may have a configuration in which the first identification information represents a relative position of the first image with respect to the second image, and the second identification information represents a relative position of the second image with respect to the first image.

According to such a configuration, it is possible to convert the coordinates according to the position of the image to be displayed.

In the aspect of the invention, the display system may have a configuration in which the first identification information is an identifier of the first display device, the second identification information is an identifier of the second display device, a storage unit storing the first identification information and the display position of the first image in association with each other, and the second identification information and the display position of the second image in association with each other is provided, and the conversion unit converts the first coordinate information according to the display position which is stored in association with the first identification information, and the second coordinate information according to the display position stored in association with the second identification information.

According to such a configuration, it is possible to convert the coordinates according to the position of the image to be displayed.

In the aspect of the invention, the display system may have a configuration in which the first specifying unit identifies the indicator indicating the first image, the second specifying unit identifies the indicator indicating the second image, the first output unit outputs an indicator identifier representing the indicator which is identified by the first specifying unit, the second output unit outputs an indicator identifier representing the indicator which is identified by the second specifying unit, and the conversion unit sets coordinates into which the first coordinate information or the second coordinate information output along with the indicator identifier is converted as coordinates of the indicator which is identified by the indicator identifier.

According to such a configuration, in a case where the indicator is moved from one to the other on adjacent images displayed by different devices, it is possible to perform processing according to the movement of the indicator with respect to each of a plurality of indicators.

In the aspect of the invention, the display system may have a configuration in which an acquisition unit acquiring the first coordinate information or the second coordinate information relevant to the indicator with respect to each of a plurality of indicators is provided, and the conversion unit converts the first coordinate information or the second coordinate information which is acquired by the acquisition unit.

According to such a configuration, in a case where the indicator is moved from one to the other on adjacent images displayed by different devices, it is possible to perform processing according to the movement of the indicator with respect to each of the plurality of indicators.

In the aspect of the invention, the display system may have a configuration in which a first mode in which the information processing device supplies an image to one display device; and a second mode in which the information processing device supplies an image to a plurality of display devices are provided, in a case of the second mode, the first display device outputs the first coordinate information and the first identification information, and in a case of the second mode, the second display device outputs the second coordinate information and the second identification information.

According to such a configuration, in a case where the indicator is moved from one to the other on adjacent images displayed by the first display device and the second display device, it is possible to perform processing according to the movement of the indicator.

Another aspect of the invention provides a display device including: a display unit displaying an image which is supplied from an information processing device; a specifying unit specifying coordinates of a position which is indicated by an indicator in the image displayed by the display unit; and an output unit outputting coordinate information representing the coordinates which are specified by the specifying unit, and identification information identifying a display position of the image which is displayed by the display unit.

Still another aspect of the invention provides an information processing device including: a first acquisition unit acquiring first coordinate information representing coordinates of a position indicated by an indicator in a first image which is displayed by a first display device on the basis of first image data supplied from an own device, and first identification information identifying a display position of the first image; a second acquisition unit acquiring second coordinate information representing coordinates of a position indicated by an indicator in a second image which is displayed by a second display device on the basis of second image data supplied from the own device, and second identification information identifying a display position of the second image; and a conversion unit converting the first coordinate information acquired by the first acquisition unit into third coordinate information representing coordinates in a coordinate system of the own device on the basis of the first identification information acquired by the first acquisition unit, and the second coordinate information acquired by the second acquisition unit into fourth coordinate information representing coordinates in the coordinate system of the own device on the basis of the second identification information acquired by the second acquisition unit.

According the display device and the information processing device, in a case where the indicator is moved from one to the other on adjacent images displayed by different devices, it is possible to perform processing according to the movement of the indicator.

Yet another aspect of the invention provides an information processing method including: supplying first image data and second image data to a first display device and a second display device from an information processing device, and displaying a first image which is displayed by the first display device on the basis of the first image data and a second image which is displayed by the second display device on the basis of the second image data side by side; first specifying coordinates of a position which is indicated by an indicator in the first image; first outputting first coordinate information representing the coordinates which are specified in the first specifying, and first identification information identifying a display position of the first image; second specifying coordinates of a position which is indicated by the indicator in the second image; second outputting second coordinate information representing the coordinates which are specified in the second specifying, and second identification information identifying a display position of the second image; and converting the first coordinate information output in the first outputting into third coordinate information representing coordinates in a coordinate system of the information processing device on the basis of the first identification information output in the first outputting, and the second coordinate information output in the second outputting into fourth coordinate information representing coordinates in the coordinate system of the information processing device on the basis of the second identification information output in the second outputting.

According to the aspect of the invention, in a case where the indicator is moved from one to the other on adjacent images displayed by different devices, it is possible to perform processing according to the movement of the indicator.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
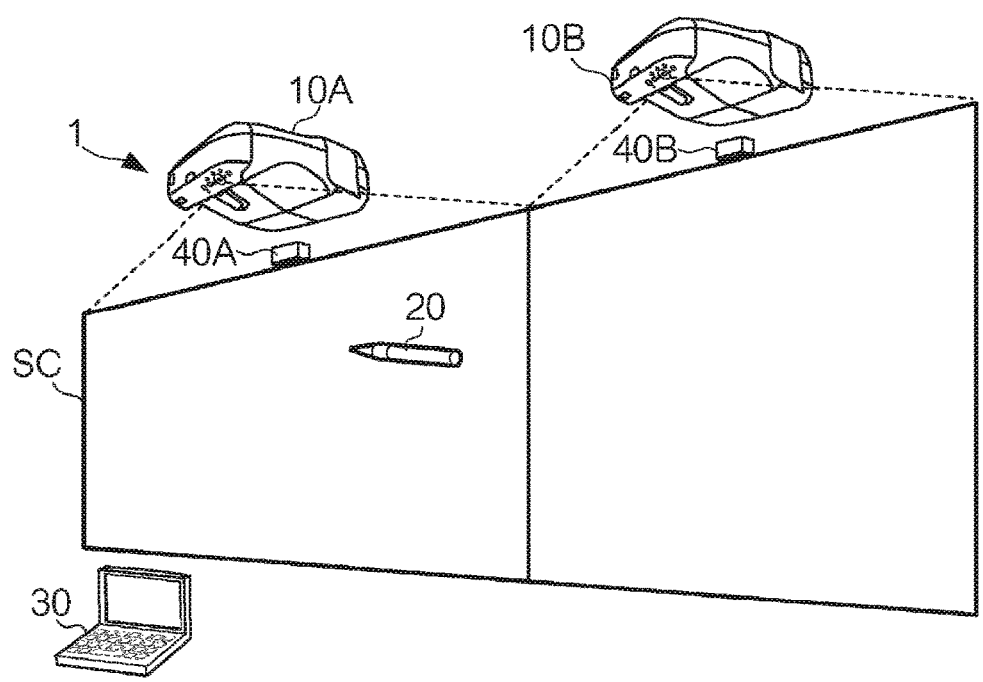
FIG. 1 is a diagram illustrating a device according to a display system.

FIG. 1 is a diagram illustrating a device according to a display system 1 which is an embodiment of the invention. The display system 1 includes an information processing device 30, and a projector 10A (a first projector) and a projector 10B (a second projector) projecting an image onto a screen SC which becomes a display surface.

In this embodiment, the information processing device 30 is a personal computer. The information processing device 30 has a multi display function of extending a desktop by using a plurality of display devices.

The pen 20 which is an example of an indicator, functions as a pointing device for operating the projectors 10A and 10B or the information processing device 30. In addition, in this embodiment, a finger of a user can also function as an indicator for operating the information processing device 30.

The projectors 10A and 10B which are an example of a display device, project an image represented by a video signal which is supplied from the information processing device 30 onto the screen SC. In this embodiment, the projectors 10A and 10B become the display device when the information processing device 30 uses the multi display function. In addition, the projectors 10A and 10B have a PC operation function for using the pen 20 as a pointing device of the information processing device 30. The projectors 10A and 10B are disposed obliquely upward on the screen SC, and project a video onto the screen SC. Furthermore, in this embodiment, the projectors 10A and 10B project the video onto the screen SC, and may project the video onto a wall surface (the display surface) instead of the screen SC. In addition, in this embodiment, the projectors 10A and 10B have a configuration in which the projectors 10A and 10B are disposed on the wall surface by a clasp, but may be disposed on the ceiling. In a case where the projectors 10A and 10B are disposed on the ceiling, the projectors 10A and 10B may project the video onto a desk instead of the screen SC.

Light emitting devices 40A and 40B include a light emitting unit irradiating a finger on the screen SC with light. The light emitting devices 40A and 40B are disposed on an upper end of the screen SC, and diffuse infrared light to a downward direction in a range of an angle of θ in order to allow the infrared light to exit. The light exiting from the light emitting devices 40A and 40B forms a light layer along the screen SC. In this embodiment, the angle of θ reaches approximately 180 degrees, and the light layer is formed on approximately the entire screen SC. It is preferable that the surface of the screen SC is close to the light layer which is formed by the light emitting device 40. The light layer has a thickness such that a finger in a position which is separated from the surface of the screen SC can be irradiated with light. In addition, the finger in the separated position may be irradiated with light by laminating the light emitting unit. The exiting of the light from the light emitting device 40A is controlled by the projector 10A, and the exiting of the light from the light emitting device 40B is controlled by the projector 10B.

Configurations of Projectors 10A And 10B, and Pen 20

Figure 2:
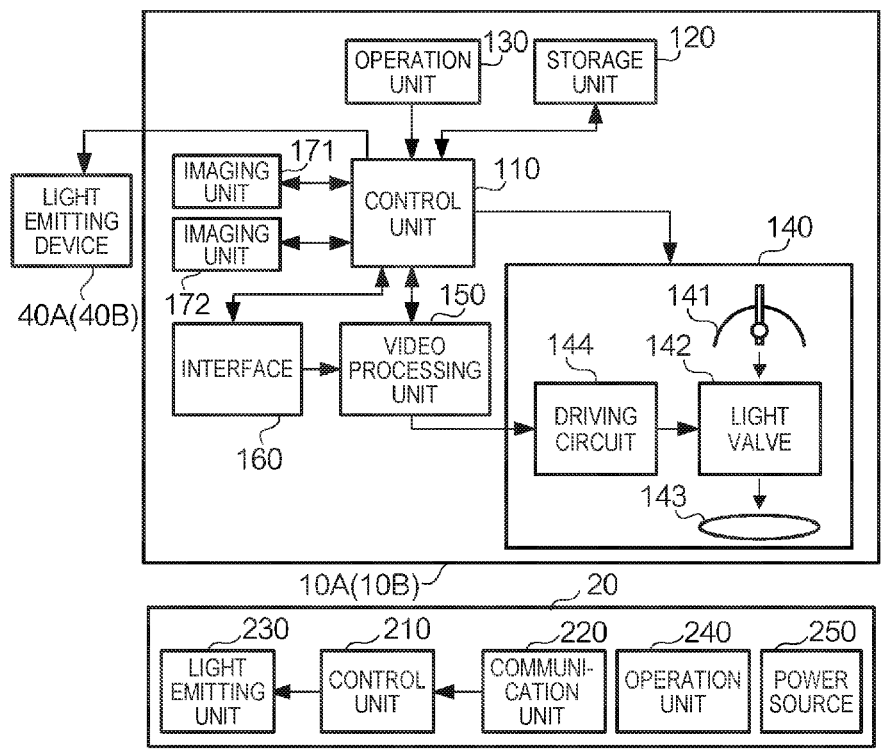
FIG. 2 is a diagram illustrating hardware configurations of projectors and a pen.

FIG. 2 is a diagram illustrating hardware configurations of the projectors 10A and 10B, and the pen 20. The pen 20 includes a control unit 210, a communication unit 220, a light emitting unit 230, an operation unit 240, and a power source 250. The power source 250, for example, is a dry cell or a secondary cell, and supplies electric power to the control unit 210, the communication unit 220, the light emitting unit 230, and the operation unit 240. The operation unit 240 includes a switch (not illustrated) controlling the supply of the electric power from the power source 250 to each unit. In a case where the switch of the operation unit 240 is turned on, the electric power is supplied from the power source 250 to each of the units, and in a case where the switch of the operation unit 240 is turned off, the supply of the electric power from the power source 250 to each of the units is stopped. The light emitting unit 230 includes a light emitting diode emitting infrared light, and is disposed on the tip of the pen 20. The lighting-on and the lighting-off of the light emitting unit 230 are controlled by the control unit 210. The light emitting unit 230 is a point light source, and the light emitted from the light emitting unit 230 spreads onto a spherical surface from the tip of the pen 20. The communication unit 220 includes a light receiving element receiving infrared light. The communication unit 220 receives various signals which are transmitted from the projector 10 by the infrared light. The communication unit 220 converts the received various signals into electric signals, and supplies the converted electric signals to the control unit 210. The control unit 210 is connected to the light emitting unit 230 and the communication unit 220. The control unit 210 starts the control of the light emitting unit 230 according to the signal which is supplied from the communication unit 220, and controls the lighting-on and the lighting-off of the light emitting diode of the light emitting unit 230.

The projectors 10A and 10B include a control unit 110, a storage unit 120, an operation unit 130, and a projection unit 140. In addition, the projectors 10A and 10B include a video processing unit 150, an interface 160, and an imaging unit 171 and an imaging unit 172. In this embodiment, the hardware configurations of the projectors 10A and 10B are identical to each other, and thus, in the following description, in a case where it is necessary to distinguish each unit of the projector 10A from each unit of the projector 10B, for the sake of simplicity of the description, "A" is added to the end of the reference numeral of each of the units of the projector 10A, and "B" is added to the end of the reference numeral of each of the units of the projector 10B, and in a case where it is not necessary to distinguish the units from each other, the description will be performed without adding "A" or "B" to the end of the reference numeral.

The interface 160 includes a plurality of connectors to which a video signal is supplied, such as RCA, D-Sub, and HDMI (Registered Trademark), and supplies the video signal which is supplied to the connector from the other device to the video processing unit 150. In addition, the interface 160 includes an interface of wireless communication such as a wireless local area network (LAN) or Bluetooth (Registered Trademark), and an interface of wire communication such as a universal serial bus (USB) or a wired LAN, and performs communication with the information processing device 30 by the interface. In addition, the interface 160 includes a light emitting diode emitting infrared light. The lighting-on and lighting-off of the light emitting diode of the interface 160 are controlled by the control unit 110, and the interface 160 transmits the signal of the infrared light for controlling the lighting-on and lighting-off of the light emitting unit 230 of the pen 20.

The storage unit 120 stores a setting value relevant to image quality of a video to be projected, or information relevant to the setting of various functions. The operation unit 130 includes a plurality of buttons for operating the projector 10. The control unit 110 controls each unit according to the operated button, and thus, the adjustment of the video to be projected onto the screen SC, the setting of the various functions of the projector 10, and the like are performed.

The video processing unit 150 acquires the video signal which is supplied from the interface 160. In addition, the video processing unit 150 acquires a signal of an on-screen image for operating the projector 10, such as GUI, from the control unit 110. The video processing unit 150 has various image processing functions, performs image processing with respect to the video signal which is supplied from the interface 160, and adjust the image quality of the video to be projected. In a case where the signal of the on-screen image is supplied from the control unit 110, the video processing unit 150 supplies the video signal superimposed on the signal of the on-screen image to the projection unit 140.

The projection unit 140 projecting the video includes a light source 141, a light valve 142, a driving circuit 144, and a projection optical system 143. The light source 141 is a lamp emitting light, and the light emitted from the light source 141 is dispersed into red light, green light, and blue light by a plurality of dichroic mirrors or a mirror (not illustrated), and each of the dispersed red light, green light, and blue light is guided to the light valve 142. Furthermore, the light source 141 may not be a lamp, but may be a light emitting diode or a semiconductor laser device emitting laser light.

The driving circuit 144 acquires the video signal which is supplied from the video processing unit 150. The video signal to be supplied to the driving circuit 144 includes gradation data representing a gradation of a red component on an image to be projected, gradation data representing a gradation of a green component on the image to be projected, and gradation data representing a gradation of a blue component on the image to be projected. The driving circuit 144 extracts the gradation data of each color of red, green, and blue, and drives the light valve 142 on the basis of the extracted gradation data of each of the colors.

The light valve 142 includes a liquid crystal light valve on which the red light described above is incident, and a liquid crystal light valve on which the green light described above is incident, and a liquid crystal light valve on which the blue light described above is incident. The liquid crystal light valve is a transmissive liquid crystal panel, and includes pixels which are arranged into the shape of a matrix of a plurality of rows and a plurality of columns. The liquid crystal light valve on which the red light is incident is driven on the basis of the gradation data of red, the liquid crystal light valve on which the green light is incident is driven on the basis of the gradation data of green, and the liquid crystal light valve on which the blue light is incident is driven on the basis of the gradation data of blue. In each of the liquid crystal light valve, each of the pixels is controlled by the driving circuit 144, and thus, the transmittance of the pixel is changed. The transmittance of the pixel is controlled, and thus, light of each of the colors which is transmitted through the liquid crystal light valve becomes an image corresponding to each of the gradation data items. The images of the red light, the green light, and the blue light which are transmitted through the liquid crystal light valves are synthesized by a dichroic prism (not illustrated), and are incident on the projection optical system 143. The projection optical system 143 is an optical system enlarging the incident image, and enlarges the incident image by a lens or a mirror and projects the enlarged image onto the screen SC. In a case where the image is projected onto the screen SC, the image is displayed on the screen SC which is the display surface. Furthermore, a reflective liquid crystal panel may be adopted instead of the transmissive liquid crystal panel, and a digital mirror device or the like may be used.

In order to specify the position of the pen 20 and a distance from the pen 20 to the screen SC by a stereo system, the projectors 10A and 10B include two imaging units of an imaging unit 171 and an imaging unit 172. The imaging unit 171 and the imaging unit 172 include an imaging element (CMOS, CCD, or the like) receiving infrared light which is emitted from the light emitting unit 230, an optical system forming an image on the imaging element, a diaphragm limiting the light which is incident on the imaging element, and the like. The imaging unit 171 and the imaging unit 172 set a projection range of the projection unit 140 to an imaging range, generate an image in the imaging range, and supply the generated image to the control unit 110. Furthermore, in this embodiment, the projectors 10A and 10B are disposed obliquely upward on the screen SC, and thus, the imaging unit 171 and the imaging unit 172 image the projection range from the oblique upper side.

The control unit 110 is a microcomputer including a central processing unit (CPU), a read only memory (ROM), and a random access memory (RAM). In a case where a program stored in the ROM is executed by the CPU, the control unit 110 controls each unit, and thus, a function of projecting a video onto the screen SC, the PC operation function described above, and the like are realized.

Figure 3:
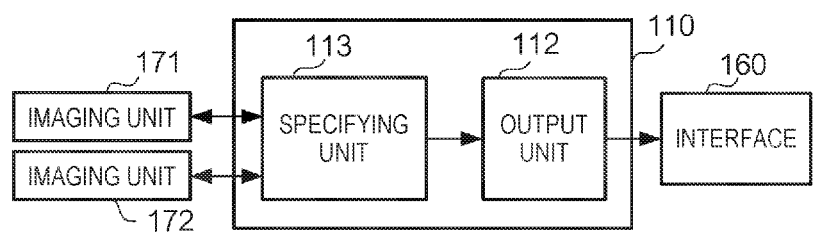
FIG. 3 is a functional block diagram of a function which is realized in a control unit.

FIG. 3 is a functional block diagram of the function which is realized in the control unit 110 by executing the program in the ROM. The specifying unit 113 analyzes the images which are supplied from the imaging unit 171 and the imaging unit 172, and specifies an event which occurs due to the pen 20 or the finger which is the indicator. In addition, the specifying unit 113 analyzes the images which are supplied from the imaging unit 171 and the imaging unit 172, and specifies the coordinates of the position of the indicator in a display region of the image which is projected from the projection unit 140, and the distance from the indicator to the screen SC which is the display surface of the image.

Figure 4:
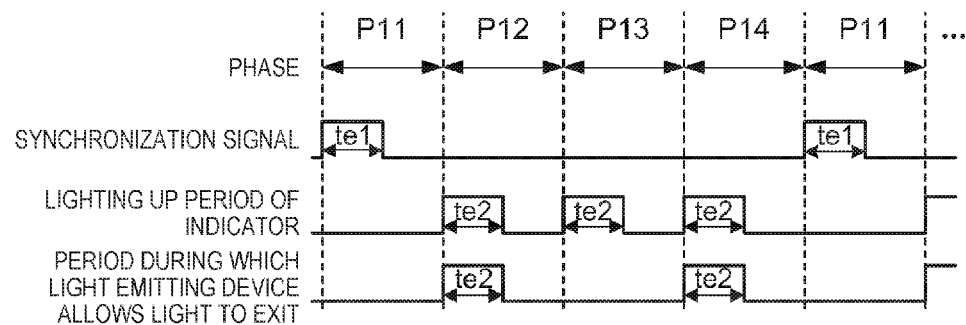
FIG. 4 is a diagram illustrating an example of a time chart of detecting an indicator.

The specifying unit 113 periodically specifies the position of the light emitting unit 230 of the pen 20 in the project region of the image or the position of the finger which is an example of the indicator, for example, on a time chart illustrated in FIG. 4. As illustrated in FIG. 4, a period of specifying the position of the finger or the position of the light emitting unit 230 has four phases of a phase P11 to a phase P14. At the time of detecting the position of the finger or the position of the light emitting unit 230, the phase P11 to phase P14 are repeated. The phase P11 is a phase for synchronizing a timing at which the projector 10 performs imaging by using the imaging unit 171 and the imaging unit 172 with a timing at which the pen 20 emits light and a timing at which the light emitting device 40 allows the infrared light to exit. In the phase P11, the specifying unit 113 controls the communication unit 180 such that a synchronization signal of the infrared light is output in a predetermined period te1.

In the pen 20, the communication unit 220 receives the synchronization signal, and in a case where a predetermined time has elapsed after receiving the synchronization signal, the control unit 210 controls the light emitting unit 230 such that the lighting-on of the light emitting unit 230 is performed in a period te2 which is set in advance. In this embodiment, the light emitting unit 230 is controlled such that the lighting-on of the light emitting unit 230 is performed from a start time point of the phase P12, the phase P13, and the phase P14. In addition, the specifying unit 113 controls the light emitting device 40 such that the light emitting device 40 allows the infrared light to exit in the period te2 from a start time of the phase P12 and the phase P14.

In the phase P12 to the phase P14, the specifying unit 113 controls the imaging unit 171 and the imaging unit 172, and images a predetermined range including the screen SC at a shutter speed which is set. An exposure period during which exposure is performed by an electronic shutter function in the imaging unit 171 and the imaging unit 172 starts from the start time point of each of the phases of the phase P12, the phase P13, and the phase P14. A time point at which the exposure ends is determined by the shutter speed which is set, and is in the period of each of the phases. The images which are imaged by the imaging unit 171 and the imaging unit 172 in the exposure period of the phase P12 to the phase P14 are supplied to the specifying unit 113.

The specifying unit 113 specifies the position of the finger or the light emitting unit 230 on the projected image, and a distance from the screen SC to the light emitting unit 230 by using the images which are supplied from the imaging unit 171 and the imaging unit 172. Specifically, in the phase P12 and the phase P14, in a case where the finger is irradiated with the infrared light emitted from the light emitting device 40, the infrared light which exits from the light emitting device 40 and is reflected on the finger is displayed on the images obtained by the imaging unit 171 and the imaging unit 172. In addition, in the phase P12 and the phase P14, in a case where the light emitting unit 230 is in the imaging range of the imaging unit 171 and the imaging unit 172, the infrared light emitted from the light emitting unit 230 is also displayed on the images obtained by the imaging unit 171 and the imaging unit 172. In the phase P13, the light emitting device 40 does not allow light to exit, and thus, the infrared light emitted from the light emitting unit 230 is displayed on the images obtained by the imaging unit 171 and the imaging unit 172.

In the phase P12 to the phase P14, the specifying unit 113 specifies the position of the infrared light displayed on the image which is obtained by the imaging unit 171 and the imaging unit 172 and the distance to the screen SC by a stereo method. In the infrared light of which the position is specified in the phase P12 and the phase P14, the specifying unit 113 specifies infrared light in a position close to the position of the infrared light of which the position is specified in the phase P13, and set the specified position of the infrared light to the position of the light emitting unit 230. In addition, in the infrared light of which the position is specified in the phase P12 and the phase P14, the specifying unit 113 sets the position of infrared light separated from the infrared light of which the position is specified in the phase P13 to the position of the finger. Furthermore, in a case where the infrared light is not in the imaging range in the phase P13, the specifying unit 113 sets the position which is specified in the phase P12 and the phase P14 to the position of the finger. The specified position is used at the time of performing a drawing function or the operation of the GUI.

The output unit 112 transmits an indicator ID which is an example of an indicator identifier representing the type of the indicator of which the position is specified by the specifying unit 113, event information representing the event of the indicator which is specified by the specifying unit 113, coordinate information representing the coordinates of the position which is specified by the specifying unit 113, identification information representing to which one of two screens having a multi display function an image projected from an own device corresponds, and the like to the information processing device 30 from the interface 160 through a USB cable.

Configuration of Information Processing Device 30

Next, the configuration of the information processing device 30 will be described. The information processing device 30 is a computer including a central processing unit (CPU), a read only memory (ROM), and a random access memory (RAM). In the information processing device 30, a device driver which acquires the information supplied from the projectors 10A and 10B, and uses the projectors 10A and 10B as the pointing device is installed.

Figure 5:
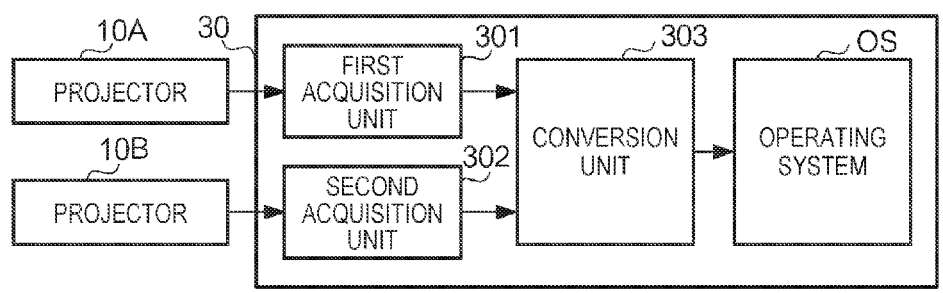
FIG. 5 is a functional block diagram of a function which is realized in an information processing device.

FIG. 5 is a functional block diagram of the function which is realized in the information processing device 30 by executing the device driver. A first acquisition unit 301 acquires various information items which are supplied from the projector 10A. A second acquisition unit 302 acquires various information items which are supplied from the projector 10B.

Figure 6:
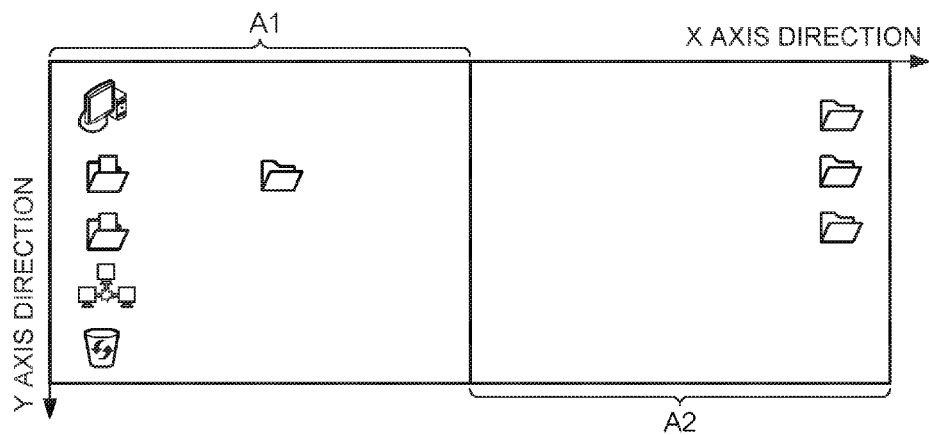
FIG. 6 is a diagram illustrating an example of an image which is projected onto a screen.

In a case where the event information which is acquired by the first acquisition unit 301 and the event information which is acquired by the second acquisition unit 302 satisfy predetermined conditions, a conversion unit 303 converts a set of the event information which is acquired by the first acquisition unit 301 and the event information which is acquired by the second acquisition unit 302 into predetermined event information. In addition, the conversion unit 303 converts the coordinate information which is acquired by the first acquisition unit 301 and the coordinate information which is acquired by the second acquisition unit 302 into the coordinates of the screen which is extended by the multi display function. For example, a screen example illustrated in FIG. 6 is a diagram illustrating an example of the images which are projected from the projectors 10A and 10B at the time of using the multi display function, and a portion of a region A1 is an image which is projected from the projector 10A, and a portion of a region A2 is an image which is projected from the projector 10B.

In images obtained by an imaging unit 171A and an imaging unit 172A, a specifying unit 113A sets a coordinate system by using the apex of the region A1 on the upper left side as an original point, and by including an X axis in a right direction and a Y axis in a lower direction, and thus, specifies the coordinates of the pen 20. In addition, in images obtained by an imaging unit 171B and an imaging unit 172B, a specifying unit 113B sets a coordinate system by using the apex of the region A2 on the upper left side as an original point, and by including an X axis in the right direction and a Y axis in the lower direction, and specifies the coordinates of the pen 20. In addition, in the entire region of the region A1 and the region A2, the information processing device 30 sets a coordinate system by using the apex of the region A1 on the upper left side as an original point, and by including an X axis in the right direction and a Y axis in the lower direction.

In this embodiment, the coordinates which are specified by the specifying unit 113A are normalized, and the original point becomes (0,0), a coordinate range in an X axis direction becomes 0 to 100, and a coordinate range in a Y axis direction becomes 0 to 100. In a case where the coordinates of the specified pen 20 are on the left end of the region A1, the specifying unit 113A sets the coordinates in the X axis direction to 0, and in a case where the coordinates of the specified pen 20 are on the right end of the region A1, the specifying unit 113A sets the coordinates in the X axis direction to 100.

In addition, the coordinates which are specified by the specifying unit 113B are also normalized, the original point becomes (0,0), a coordinate range in the X axis direction becomes 0 to 100, and a coordinate range in the Y axis direction becomes 0 to 100. In a case where the coordinates of the specified pen 20 are on the left end of the region A2, the specifying unit 113B sets the coordinates in the X axis direction to 0, and in a case where the coordinates of the specified pen 20 are on the right end of the region A2, the specifying unit 113B sets the coordinates in the X axis direction to 100.

In addition, the coordinates of the information processing device 30 are also normalized, the original point becomes (0,0), a coordinate range in the X axis direction becomes 0 to 100, and a coordinate range in the Y axis direction becomes 0 to 100. That is, in the left end of the region A1, the coordinates in the X axis direction become 0, and in the right end of the region A2, the coordinates in the X axis direction become 100.

In the region A1, in a case where the projector 10A specifies the position of the pen 20 which is the apex of the region A1 on the upper right side, the coordinate information of the pen 20 becomes coordinates which are represented by the coordinate system set in the projector 10A, and the coordinate information (first coordinate information) is acquired by the first acquisition unit 301. The conversion unit 303 converts the coordinate information which is acquired by the first acquisition unit 301 into coordinate information corresponding to the coordinate system which is set in the region A1 by the information processing device 30. For example, in a case where the coordinates which are specified by the projector 10A are (50,50), the conversion unit 303 converts the coordinate information representing the coordinates into coordinate information (third coordinate information) representing coordinates of (25,50).

In addition, in the region A2 illustrated in FIG. 6, in a case where the projector 10B specifies the position of the coordinates of the pen 20 which is the apex of the region A2 on the upper right side, the coordinate information of the pen 20 becomes coordinates which are represented by the coordinate system set in the projector 10B, and the coordinate information (second coordinate information) is acquired by the second acquisition unit 302. The conversion unit 303 converts the coordinate information which is acquired by the second acquisition unit 302 into coordinate information corresponding to the coordinate system which is set in the region A2 by the information processing device 30. For example, in a case where the coordinates which are specified by the projector 10B are (50,50), the conversion unit 303 converts the coordinate information representing the coordinates into coordinate information (fourth coordinate information) representing coordinates of (75,50). The conversion unit 303 supplies the event information or the coordinate information to an operating system OS. In a case where the CPU of the information processing device 30 executes a program stored in the ROM of the information processing device 30, a function of the conversion unit 303 is realized.

Operational Example of Embodiment

Next, an operational example of this embodiment will be described. In this embodiment, the information processing device 30 and the projectors 10A and 10B are connected to each other by a USB cable, and perform communication through the USB cable. In addition, the information processing device 30 and the projectors 10A and 10B are connected to each other by a video cable, and the projectors 10A and 10B acquire the video signal which is supplied from the information processing device 30.

In the information processing device 30, the setting of the multi display function of extending a desktop by laterally arranging two screens side by side is performed, and the information processing device 30 supplies a video signal (first image data) of a screen on the left side to the projector 10A and supplies a video signal (second image data) of a screen on the right side to the projector 10B. In addition, in the projectors 10A and 10B, the setting of determining to which one of two screens having a multi display function the screen corresponds is performed, and setting to the effect that the screen corresponds to a screen of "left" is performed in the projector 10A, and setting to the effect that the screen corresponds to a screen of "right" is performed in the projector 10B.

FIG. 6 is an example of the images which are projected onto the screen SC from the projectors 10A and 10B. In FIG. 6, the portion of the region A1 is the image (a first image) which is projected from the projector 10A, and the portion of the region A2 is the image (a second image) which is projected from the projector 10B. In a case of using a direct viewing display device with the multi display function, the display device includes a frame (a bezel) surrounding the display screen, and thus, there is a gap between the screen on the left side and the screen on the right side, but in this embodiment, it is possible to laterally display the image which is projected from the projector 10A and the image which is projected from the projector 10B side by side (so-called tiling display), and thus, it is possible to display the two screens side by side without having a gap therebetween.

The imaging unit 171A and the imaging unit 172A image the region A1. In the images which are supplied from the imaging unit 171A and the imaging unit 172A, a control unit 110A sets xy coordinates by using the apex of the region A1 on the upper left side as an original point, and by setting the right direction from the original point to a positive direction of the x axis and the lower direction from the original point to a positive direction of the y axis. In addition, the imaging unit 171B and the imaging unit 172B image the region A2. In the images which are supplied from the imaging unit 171B and the imaging unit 172B, a control unit 110B sets xy coordinates by using the apex of the region A2 on the upper left side as an original point, and by setting the right direction from the original point to the positive direction of the x axis and the lower direction from the original point to the positive direction of the y axis.

In a case where the pen 20 emitting the infrared light enters an imaging range of the imaging unit 171A and the imaging unit 172A, the infrared light emitted from the light emitting unit 230 is displayed on the images generated by the imaging unit 171A and the imaging unit 172A. The control unit 110A (the specifying unit 113: a first specifying unit) analyzes the images which are supplied from the imaging unit 171A and the imaging unit 172A, and specifies the coordinates of the position of the infrared light in the xy coordinates of the region A1 and a distance from the infrared light to the screen SC (that is, a distance from the tip of the pen 20 to the screen SC).

Figure 7:
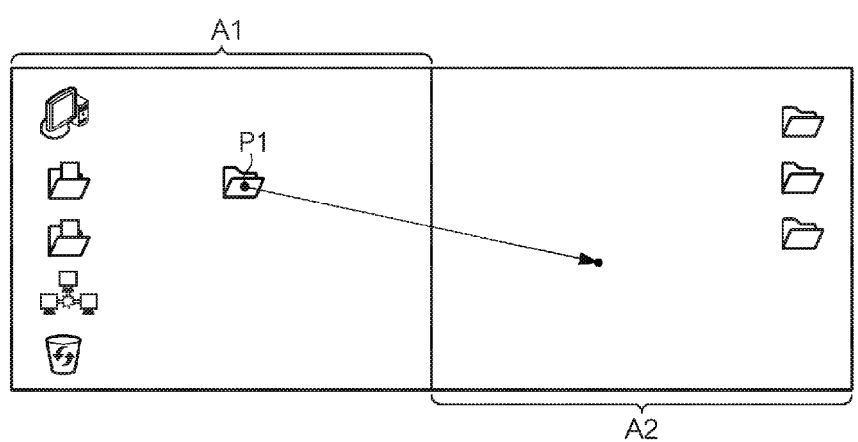
FIG. 7 is a diagram for illustrating an operational example.

For example, in a case where the user brings the light emitting unit 230 of the pen 20 into contact with a position P1 illustrated in FIG. 7, the control unit 110A analyzes the images which are supplied from the imaging unit 171A and the imaging unit 172A, specifies the distance from the infrared light to the screen SC as 0, and senses that the pen 20 is in contact with the screen SC. In addition, the control unit 110A specifies the coordinates of the position P1 from the images which are supplied from the imaging unit 171A and the imaging unit 172A.

The control unit 110A (the output unit 112: a first output unit) transmits an indicator ID representing the type of the sensed indicator, event information representing the event of the indicator, coordinate information (the first coordinate information) representing the coordinates of the specified indicator, and identification information representing to which one of two screens having a multi display function the image projected from the projector 10A corresponds to the information processing device 30 from an interface 160A through a USB cable. The identification information which is transmitted from the projector 10A is an example of the first identification information representing to which one of right and left display positions the image projected from the projector 10A relatively corresponds with respect to the image displayed by the other projector. Here, the control unit 110A senses the pen 20, and thus, set the contents of the indicator ID to "pen" representing the pen, the event information to "pen-down" representing that the pen 20 is in contact with a projection surface, and the identification information to "left" since the setting to the effect that the screen of the projector 10A corresponds to the left side is performed.

The information processing device 30 (the first acquisition unit 301) acquires the information which is transmitted from the projector 10A, and performs processing according to the acquired information. First, the information processing device 30 (the conversion unit 303) converts the coordinate information included in the acquired information into the coordinates of the screen which is extended by the multi display function. Specifically, the information processing device 30 sets xy coordinates by using the apex of the extended rectangular screen on the upper left side as an original point, and by setting the right direction from the original point to the positive direction of the x axis and the lower direction from the original point to the positive direction of the y axis. In a case where the event information is "pen-down", and the acquired identification information is "left", the information processing device 30 converts the acquired coordinate information into the coordinates in a left side region which is displayed by the projector 10A. In a case where the coordinates after being converted are in the position P1 on an icon, the information processing device 30 drags the icon in the position P1.

The control unit 110A periodically specifies the distance from the infrared light to the screen SC and the position of the infrared light by using the images which are supplied from the imaging unit 171A and the imaging unit 172A. In a case where the user moves the pen 20 from the position P1 to the direction of an arrow illustrated in FIG. 7, the control unit 110A analyzes the images which are supplied from the imaging unit 171A and the imaging unit 172A, and specifies the distance from the infrared light to the screen SC as 0. In a case where the newly specified distance is 0, and the previously specified distance is also 0, the control unit 110A set the event of the indicator (the pen 20) to "move" representing that the indicator is being moved. In addition, the control unit 110A specifies the coordinates of the position after moving the infrared light from the images which are supplied from the imaging unit 171A and the imaging unit 172A.

The control unit 110A transmits the indicator ID, the event information, the coordinate information, and the identification information to the information processing device 30 from the interface 160A through the USB cable. Here, the control unit 110A sets the contents of the indicator ID to "pen" representing the sensed pen 20, the event information to "move" representing that the pen 20 is moved, and the identification information to "left" since the setting to the effect that the screen of the projector 10A corresponds to the left side is performed.

In a case where the event information is "move", and the acquired identification information is "left", the information processing device 30 converts the acquired coordinate information into the coordinates in the left side region which is displayed by the projector 10A. In a case where the event information is "move", the information processing device 30 moves the icon in the position P1 according to the coordinates after being converted.

Figure 8:
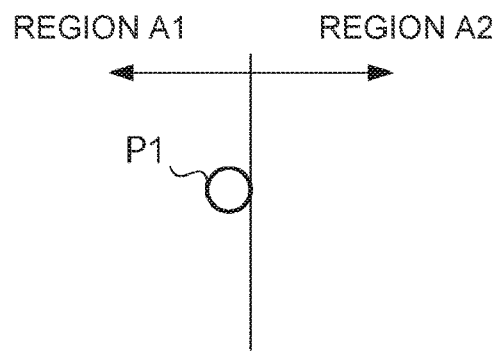
FIG. 8 is a diagram for illustrating an operational example.

Next, in a case where the user moves the pen 20 in a state of being in contact with the screen SC, and thus, the position of the infrared light which is emitted from the pen 20 becomes the position P1 on the right end of the region A1 as illustrated in FIG. 8, the control unit 110A transmits the indicator ID representing "pen", the event information representing "move", the coordinate information representing the coordinates of the position P11, and the identification information representing "left" to the information processing device 30 from the interface 160A through the USB cable. In a case where the information transmitted from the projector 10A is acquired, the information processing device 30 moves the icon in a state of being dragged according to the coordinates represented by the acquired coordinate information.

Figure 9:
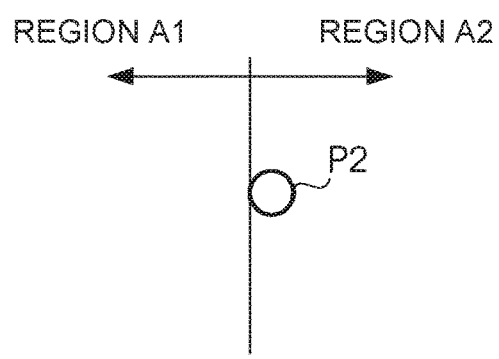
FIG. 9 is a diagram for illustrating an operational example.

Next, in a case where the user moves the pen 20 in a state of being in contact with the screen SC, and the position of the infrared light is moved to the region A2 from the region A1, and thus, becomes a position P2 on a left end of the region A2 as illustrated in FIG. 9, the infrared light emitted from the pen 20 is not displayed on the images which are generated by the imaging unit 171A and the imaging unit 172A, but the infrared light emitted from the pen 20 is displayed on the images which are generated by the imaging unit 171B and the imaging unit 172B.

In a case where the infrared light is not displayed on the images which are generated by the imaging unit 171A and the imaging unit 172A, the control unit 110A sets the event of the indicator to "pen-up" representing that the indicator is separated from the projection surface.

In contrast, the infrared light emitted from the light emitting unit 230 is displayed on the images which are generated by the imaging unit 171B and the imaging unit 172B. The control unit 110B (the specifying unit 113: a second specifying unit) acquires the images which are supplied from the imaging unit 171B and the imaging unit 172B. The control unit 110B analyzes the images which are supplied from the imaging unit 171B and the imaging unit 172B, specifies the distance from the infrared light to the screen SC as 0, and senses that the pen 20 is in contact with the screen SC. In addition, the control unit 110B specifies the coordinates of the position P2 from the images which are supplied from the imaging unit 171B and the imaging unit 172B.

The control unit 110A transmits the indicator ID, the event information, the coordinate information, and the identification information to the information processing device 30 from the interface 160A through the USB cable. Here, the control unit 110A sets the contents of the indicator ID to "pen" representing the pen, the event information to "pen-up" representing that the pen 20 is separated from the projection surface, and the identification information to "left".

In addition, the control unit 110B (the output unit 112: a second output unit) transmits the indicator ID, the event information, the coordinate information (the second coordinate information), and the identification information to the information processing device 30 from the interface 160B through the USB cable. Here, the control unit 110B sets the contents of the indicator ID to "pen" representing the sensed pen, the event information to "pen-down" representing that the pen 20 is in contact with the projection surface, and the identification information to "right" since the screen of the projector 10B is projected on the right side. The identification information which is transmitted from the projector 10B is an example of the second identification information representing to which one of right and left display positions the image projected from the projector 10B relatively corresponds with respect to the image which is displayed by the other projector.

The information processing device 30 acquires the information which is supplied from the projector 10A. In addition, the information processing device 30 (the second acquisition unit 302) acquires the information which is supplied from the projector 10B. The information processing device 30 (the conversion unit 303) converts the coordinate information included in the acquired information into the coordinates of the screen which is extended by the multi display function. In a case where the event information is "pen-down", and the acquired identification information is "right", the information processing device 30 converts the acquired coordinate information into the coordinates in a right side region which is displayed by the projector 10B.

In a case where event information which is supplied from one projector is changed to "pen-up" from "move", and event information which is supplied from the other projector becomes "pen-down", the information processing device 30 performs processing of replacing the event information.

Figure 10:
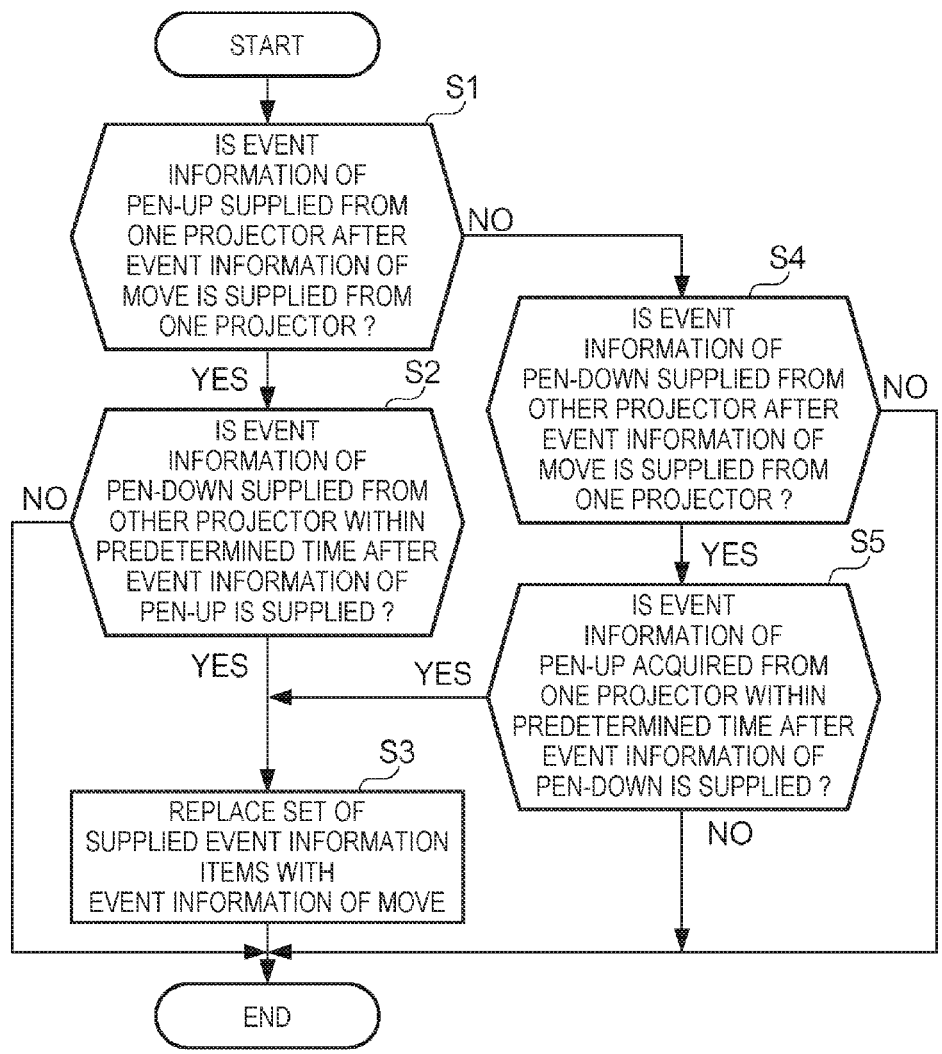
FIG. 10 is a flowchart illustrating a flow of processing which is performed by the information processing device.

FIG. 10 is a flowchart illustrating the flow of the processing of replacing the event information. The information processing device 30 determines whether or not the event information of "move" is supplied from one projector, and then, the event information of "pen-up" is supplied from the one projector (a step S1). In a case where the event information of "move" is supplied from the one projector, and the event information of "pen-up" is supplied from the one projector (YES in the step S1), the information processing device 30 determines whether or not the event information of "pen-down" is supplied from the other projector within a predetermined time after the event information of "pen-up" is supplied (a step S2). In a case where the event information of "pen-down" is supplied from the other projector within a predetermined time (YES in the step S2), the information processing device 30 replaces a set of the event information of "pen-up" which is supplied from the one projector and the event information of "pen-down" which is supplied from the other projector with the event information of "move" (a step S3). Furthermore, in a case where it is determined as NO in the step S2, the information processing device 30 ends the processing of FIG. 10.

For example, in a case where the event information of "pen-up" is supplied from the projector 10A after the event information of "move", and the event information of "pen-down" is supplied from the projector 10B within a predetermined time after the event information of "pen-up" is supplied, the information processing device 30 replaces a set of the event information of "pen-up" which is supplied from the projector 10A and the event information of "pen-down" which is supplied from the projector 10B with the event information of "move".

In addition, in a case where it is determined as NO in the step S1, the information processing device 30 determines whether or not the event information of "move" is supplied from the one projector, and then, the event information of "pen-down" is supplied from the other projector (a step S4). In a case where the event information of "move" is supplied from the one projector, and then, the event information of "pen-down" is supplied from the other projector (YES in the step S4), the information processing device 30 determines whether or not the event information of "pen-up" is acquired from the one projector within a predetermined time after the event information of "pen-down" is supplied (a step S5). In a case where the event information of "pen-up" is acquired from the one projector within a predetermined time (YES in the step S5), the information processing device 30 replaces a set of the event information of "pen-down" which is supplied from the other projector and the event information of "pen-up" which is acquired from the one projector with the event information of "move" (the step S3). Furthermore, in a case where it is determined as NO in the step S4 or in a case where it is determined as NO in the step S5, the information processing device 30 ends the processing of FIG. 10.

For example, in a case where the event information of "move" is supplied from the projector 10A, and then, the event information of "pen-down" is supplied from the projector 10B, and the event information of "pen-up" is supplied from the projector 10A within a predetermined time after the event information of "pen-down" is supplied, the information processing device 30 replaces the set of the event information of "pen-down" which is supplied from the projector 10B and the event information of "pen-up" which is supplied from the projector 10A with the event information of "move".

In a case where the set of the event information items is replaced with the event information of "move", the information processing device 30 moves the icon in a state of being dragged according to the coordinates which are supplied along with the event information of "pen-down" and are converted. Accordingly, a display position of the dragged icon becomes the position of the position P2 in the region A2.

Furthermore, even in a case where the pen 20 is moved from the region A2 to the region A1, the information processing device 30 replaces the set of the event information of "pen-up" and the event information of "pen-down" with the event information of "move", as with a case where the pen 20 is moved from the region A1 to the region A2.

As described above, according to this embodiment, the set of the event information of "pen-up" and the event information of "pen-down" is replaced with the event information of "move", and thus, even in a case where the pen 20 is moved from a region of one image of two adjacent images to a region of the other image, it is possible to smoothly move the icon in the vicinity of the boundary between the images. In addition, according to this embodiment, the information processing device 30 converts the coordinate information which is supplied from the projectors 10A and 10B, and thus, it is possible to use a plurality of projectors as a pointing device.

Furthermore, in the above description, a case where the pen 20 is sensed has been described as the operational example, but the finger, which is an example of the indicator, may be sensed by sensing the infrared light of the light emitting device 40 which is reflected on the finger. In a case where the finger is sensed, the control unit 110 sets the indicator ID to "finger". In a case where a plurality of fingers are sensed, the control unit 110 specifies the coordinates with respect to each of the sensed fingers, and transmits a plurality of specified coordinates to the information processing device 30. In this case, it is possible to use the projectors 10A and 10B as a touch panel, which is an example of the pointing device, and to perform pinch-in or pinch-out processing.

Modification Example

As described above, the embodiments of the invention have been described, but the invention is not limited to the embodiments described above, and can be implemented by other various embodiments. For example, the invention may be implemented by modifying the embodiments described above as follows. Furthermore, the invention may be implemented by suitably combining one or a plurality of embodiments described above and modification examples described below.

In the embodiments described above, the projectors 10A and 10B supply information such as "right", "left", or the like to the information processing device 30 as the identification information, but the contents of the identification information are not limited to the contents of the embodiments. For example, in a case where three projectors are used by the multi display function, in each of the three projectors, the user sets a projector projecting a left screen to "1", a projector projecting a center screen to "2", and a projector projecting a right screen to "3". The identification information is information representing to which one of a plurality of screens having a multi display function the image projected from the projector corresponds, and also becomes an identifier identifying the projector. In the information processing device 30, "1" is set as the left screen, "2" is set as the center screen, and "3" is set as the right screen. The information processing device 30 converts the acquired coordinate information according to the position of the screen which is associated with the acquired identification information. For example, in a case where "2" is acquired from the projector as the identification information, the acquired coordinate information is converted into the coordinates in a region of the midmost image which is displayed by the center projector.

In the embodiments described above, in a case where both of the pen 20 and the finger are sensed from the images which are supplied from the imaging unit 171 and the imaging unit 172, the projectors 10A and 10B may supply the indicator ID, the event information, the coordinate information, and the identification information to the information processing device 30 with respect to each of the pen 20 and the finger. In the modification example, the information processing device converts the acquired coordinate information into the coordinates of the screen which is extended by the multi display function with respect to each of the pen 20 and the finger. According to the modification example, it is possible to use both of the pen 20 and the finger as the pointing device.

In the embodiment of the invention, the information processing device 30 includes the first acquisition unit 301 and the second acquisition unit 302, but the first acquisition unit 301 acquiring the information from the projector 10A may be divided into a block of acquiring the indicator ID, the event information, the coordinate information, and the identification information in a case where the indicator ID is "pen", and a block of acquiring the indicator ID, the event information, the coordinate information, and the identification information in a case where the indicator ID is "finger". In addition, the second acquisition unit 302 acquiring the information from the projector 10B may also be divided into a block of acquiring the indicator ID, the event information, the coordinate information, and the identification information in a case where the indicator ID is "pen", and a block of acquiring the indicator ID, the event information, the coordinate information, and the identification information in a case where the indicator ID is "finger".

In the embodiment of the invention, in a case where the information processing device 30 is in a first mode where an image is supplied to one projector without using a multi display function, the projectors 10A and 10B may not output the identification information, and in a case where the information processing device 30 is in a second mode where the multi display function is used, the projectors 10A and 10B may output the identification information.

In the embodiments described above, the information processing device 30 performs the drag processing according to the event information and the coordinate information which are supplied from the projectors 10A and 10B, but the processing performed according to the event information and the coordinate information which are supplied from the projectors 10A and 10B is not limited to the drag processing. For example, the information processing device 30 may perform drawing processing according to the event information and the coordinate information. According to this modification example, in a case where the information processing device 30 executes drawing software, drawing can be performed according to the movement of the pen 20. In addition, in a case where the information processing device 30 spreads the screen of the drawing software onto the entire desktop, and the pen 20 is moved from the region A1 to the region A2 or from the region A2 to the region A1 in a state where the pen 20 is brought into contact with the projection surface, it is possible to draw a line without any break on the boundary between the region A1 and the region A2.

What is claimed is:

1. A display system, which includes a computer, a first image display displaying a first image based on first image data supplied from the computer, and a second image display displaying a second image based on second image data supplied from the computer, the first image and the second image being displayed side by side, the display system comprising:
    a processor programmed to:
        specify first coordinates of a position which is indicated by an indicator in the first image;
        output first coordinate information representing the specified first coordinates to the computer, and first identification information identifying a first display position of the first image;
        specify second coordinates of a position which is indicated by the indicator in the second image;
        output second coordinate information representing the specified second coordinates to the computer, and second identification information identifying a second display position of the second image;
        in response to a user moving the indicator from the first image to the second image, convert the output first coordinate information into third coordinate information representing coordinates in a coordinate system of the computer based on the output first identification information;
        in response to the user moving the indicator from the second image to the first image, convert the output second coordinate information into fourth coordinate information representing coordinates in the coordinate system of the computer based on the output second identification information; and
        move at least one icon between the first image and the second image based on the third coordinate information and the fourth coordinate information.

2. The display system according to claim 1, wherein
    the first identification information represents a relative position of the first image with respect to the second image, and
    the second identification information represents a relative position of the second image with respect to the first image.

3. The display system according to claim 1, wherein
the first identification information is an identifier of the first image display,
the second identification information is an identifier of the second image display,
a memory storing the first identification information and the first display position of the first image in association with each other, and the second identification information and the second display position of the second image in association with each other is provided, and
the processor converts: (A) the first coordinate information according to the first display position which is stored in association with the first identification information, and (B) the second coordinate information according to the second display position stored in association with the second identification information.

4. The display system according to claim 1, wherein the processor is further programmed to:
identify the indicator indicating the first image,
identify the indicator indicating the second image,
output an indicator identifier representing the indicator indicating the first image,
the second output unit outputs an indicator identifier representing the indicator indicating the second image, and
set coordinates into which the first coordinate information or the second coordinate information output along with the indicator identifier is converted as coordinates of the indicator which is identified by the indicator identifier.

5. The display system according to claim 4, wherein the processor is further programmed to:
acquire the first coordinate information or the second coordinate information relevant to the indicator with respect to each of a plurality of indicators, wherein
the processor converts the acquired first coordinate information or the acquired second coordinate information.

6. The display system according to claim 1, further comprising:
a first mode in which the computer supplies an image to one image display; and
a second mode in which the computer supplies an image to a plurality of image displays, wherein
in a case of the second mode, the first image display outputs the first coordinate information and the first identification information, and
in a case of the second mode, the second image display outputs the second coordinate information and the second identification information.

7. An image display comprising:
a display screen displaying a first image which is supplied from a computer;
a processor programmed to:
specify coordinates of a position which is indicated by an indicator in the first image displayed by the display screen;
output first coordinate information representing the specified coordinates to the computer, and first identification information identifying a display position of the first image;
in response to a user moving the indicator from the first image to a second image, convert the output first coordinate information into third coordinate information representing coordinates in a coordinate system of the computer based on the output first identification information;

in response to the user moving the indicator from the second image to the first image, receive fourth coordinate information from the computer; and
move at least one icon between the first image and the second image based on the third coordinate information and the fourth coordinate information.

8. A computer comprising:
a processor programmed to:
acquire first coordinate information representing coordinates of a first position indicated by an indicator in a first image which is displayed by a first image display based on first image data supplied from another computer, and first identification information identifying a display position of the first image;
acquire second coordinate information representing coordinates of a second position indicated by an indicator in a second image which is displayed by a second image display based on second image data supplied from the another computer, and second identification information identifying a display position of the second image;
in response to a user moving the indicator from the first image to the second image, convert the acquired first coordinate information into third coordinate information representing coordinates in a coordinate system of the another computer based on the acquired first identification information;
in response to the user moving the indicator from the second image to the first image, convert the acquired second coordinate information into fourth coordinate information representing coordinates in the coordinate system of the another computer based on the acquired second identification information; and
move at least one icon between the first image and the second image based on the third coordinate information and the fourth coordinate information.

9. An information processing method comprising:
supplying first image data and second image data to a first image display and a second image display from an computer, and displaying side by side: (i) a first image which is displayed by the first image display on the basis of the first image data, and (ii) a second image which is displayed by the second image display on the basis of the second image data;
specifying first coordinates of a position which is indicated by an indicator in the first image;
first outputting first coordinate information representing the specified first coordinates to the computer, and first identification information identifying a display position of the first image;
specifying second coordinates of a position which is indicated by the indicator in the second image;
second outputting second coordinate information representing the specified second coordinates to the computer, and second identification information identifying a display position of the second image;
in response to a user moving the indicator from the first image to the second image, converting the output first coordinate information into third coordinate information representing coordinates in a coordinate system of the computer based on the output first identification information;
in response to the user moving the indicator from the second image to the first image, converting the output second coordinate information into fourth coordinate information representing coordinates in the coordinate system of the computer based on the output second identification information; and moving at least one icon between the first image and the second image based on the third coordinate information and the fourth coordinate information.

* * * * *